US009683607B1

(12) United States Patent
Francis

(10) Patent No.: US 9,683,607 B1
(45) Date of Patent: Jun. 20, 2017

(54) INTERLOCKING DRIVE DISC WITH ROLLING PIN ASSEMBLY

(71) Applicant: Steve Francis, St. Charles, MO (US)

(72) Inventor: Steve Francis, St. Charles, MO (US)

(73) Assignee: Steven Wayne Francis, St. Charles, MO (US)

( * ) Notice: Subject to any disclaimer, the term of this patent is extended or adjusted under 35 U.S.C. 154(b) by 0 days.

(21) Appl. No.: 15/153,430

(22) Filed: May 12, 2016

(51) Int. Cl.
| F16H 55/00 | (2006.01) |
| F16D 1/10 | (2006.01) |
| F16D 1/06 | (2006.01) |
| F16B 13/00 | (2006.01) |
| B41F 3/58 | (2006.01) |

(52) U.S. Cl.
CPC ............... *F16D 1/10* (2013.01); *B41F 3/58* (2013.01); *F16B 13/00* (2013.01); *F16D 1/06* (2013.01); *F16D 2200/0021* (2013.01)

(58) Field of Classification Search
CPC ...... F16D 2200/0021; F16D 1/06; F16D 1/10; F16B 13/00; B41F 3/58; B41F 31/305; B41F 31/34; B41F 31/004; B41F 13/008; B41F 13/012
USPC .......... 74/27, 116, 390, 415, 451, 434, 465; 464/137, 138; 192/25, 53.51, 69.6
See application file for complete search history.

(56) References Cited

U.S. PATENT DOCUMENTS

| 3,720,115 | A  | * | 3/1973  | Vertin    | B23Q 5/40 |
|           |    |   |         |           | 74/415 |
| 6,440,048 | B1 | * | 8/2002  | Bleil     | G03G 15/2053 |
|           |    |   |         |           | 228/112.1 |
| 6,716,148 | B1 |   | 4/2004  | Fortin    | |
| 6,789,477 | B2 |   | 9/2004  | Rogge     | |
| 7,255,635 | B2 | * | 8/2007  | Miyashita | B24B 37/08 |
|           |    |   |         |           | 451/269 |
| 7,462,105 | B2 | * | 12/2008 | Lattin    | F16D 3/70 |
|           |    |   |         |           | 464/137 |

* cited by examiner

*Primary Examiner* — David M Fenstermacher
*Assistant Examiner* — Jake Cook

(57) ABSTRACT

An interlocking drive plate for an anilox roll which incorporates a dowel pin with a bushing that is able to move slightly and rotate. The interlocking drive disc is similar in structure to the current structure of a drive disc for the Mark Andy P-Series printing presses. However, the stationary dowel pin has been replaced with a modified dowel pin which includes a bushing providing slight movement and rotation. The modified dowel pin, with slight movement and rotation, reduces the shear forces on the pin which in turn reduces the wear on the pin when rotated by a servomotor. This reduction in wear will cause the interlocking drive disc to last longer than traditional drive discs without the need for repair or replacement.

11 Claims, 4 Drawing Sheets

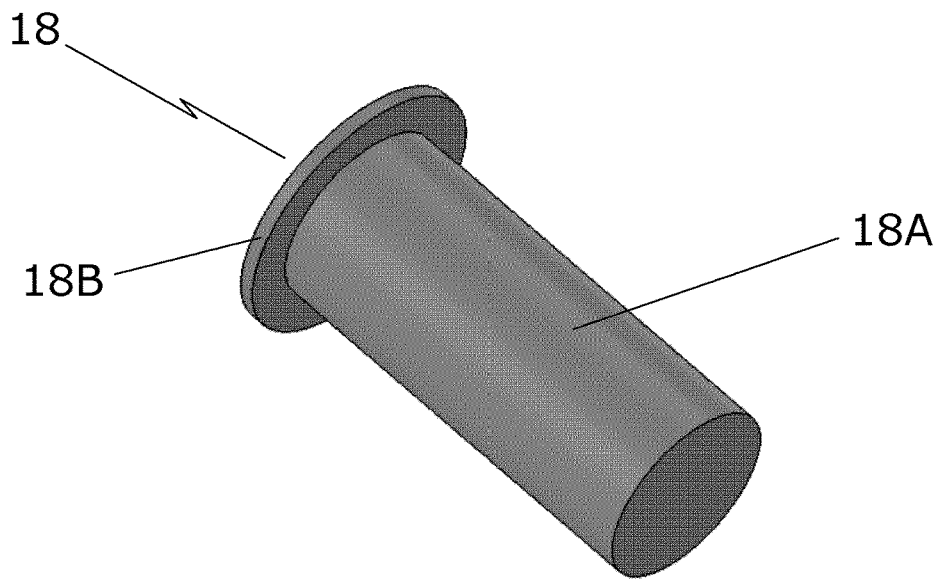
FIG. 7
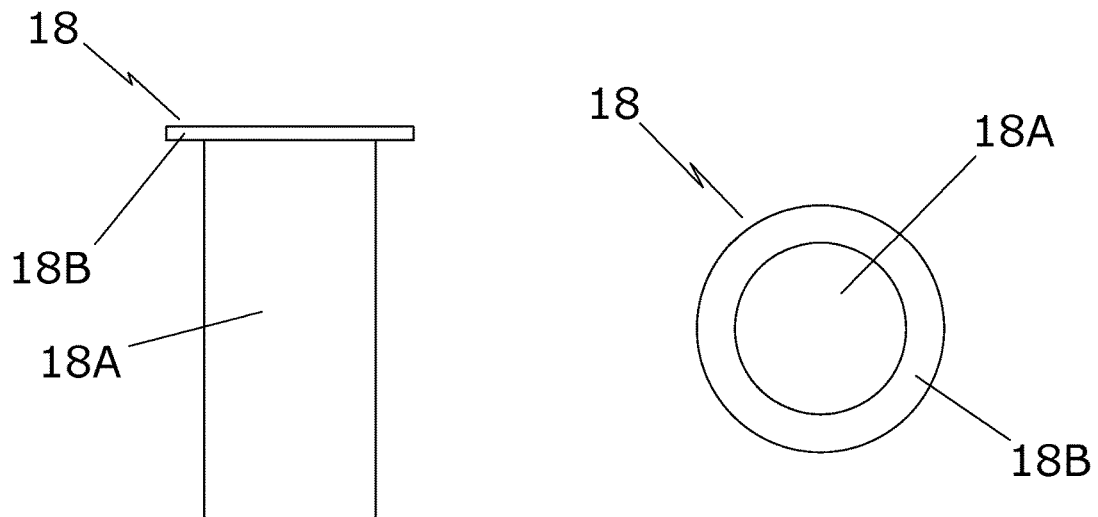
FIG. 8
FIG. 9

INTERLOCKING DRIVE DISC WITH ROLLING PIN ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to a drive pin disc for an anilox roll. Current drive pin discs for anilox rolls, specifically those for Mark Andy P-Series printing presses, use a stationary quarter-inch dowel pin to engage with the servo-motor. A servo-motor engages with the drive disc, and rotates the drive disc which in turn rotates the anilox roll. The servo motor includes a gear with a hardened pin bolted through it. This hardened pin is aligned with a stationary dowel pin on the exterior side of the drive disc. The hardened pin drives the drive disc by applying force against the dowel pin which in turn rotates the anilox roll. The hardened servomotor pin and the stationary dowel pin on the drive disc are not located on the axis of rotation. It's the parallel misalignment of the servo motor shaft to the anilox roll shaft that causes an elliptical effect. The elliptical motion causes the drive pins to wear down rapidly requiring constant replacement of the drive pin or the drive disc as a whole. If the flat edges are left they can cause chatter in the radial movement, which transfers to the image being printed. The chatter causes shadow lines in the printed image called gear marking, or barring in the printing industry. Gear marking or barrings are generally caused by bad gears or a differential in roll speed.

The prior art inventions require the shear forces of the servo motor and drive disc rotating the anilox roll to be absorbed by the stationary dowel pin. The dowel pins are not able to move or rotate which causes severe wear and tear on the dowel pins. Wear on the dowel pins can cause issues with printing such as marks in the prints. Wear can also cause the dowel pin to break of entirely. A device which provides a dowel pin that can move slightly and rotate would reduce the wear and tear on the dowel pins. By reducing the wear on the dowel pins, the drive discs will last longer which will reduce the costs of operating the printing press by reducing the downtime for repairs and reducing the costs of replacing the dowel pins or whole drive discs.

SUMMARY OF THE INVENTION

Accordingly, the invention is directed to an interlocking drive plate for an anilox roll which incorporates a dowel pin with a bushing. Specifically, the invention is related to the interlocking anilox roll drive disc for any of the Mark Andy P-Series printing presses. The drive disc is similar in structure to the current form of the drive disc. However, the stationary dowel pin has been replaced with a modified dowel pin such that a drill bushing provides slight movement and rotation. The modified dowel pin, with slight movement and rotation, reduces the shear forces on the pin which in turn reduces the wear on the pin. This reduction in wear will cause the interlocking drive discs to last longer without the need for repair or replacement.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate one embodiment of the invention and, together with the description, serve to explain the principles of the invention.

FIG. 7 is a perspective view of the modified dowel pin, showing the dowel pin body and the dowel pin cap.

FIG. 8 is a side view of the modified dowel pin, showing the dowel pin body and the dowel pin cap.

FIG. 9 is a bottom view of the modified dowel pin, showing the dowel pin body and the dowel pin cap.

DETAILED DESCRIPTION OF THE INVENTION

Figure 1:
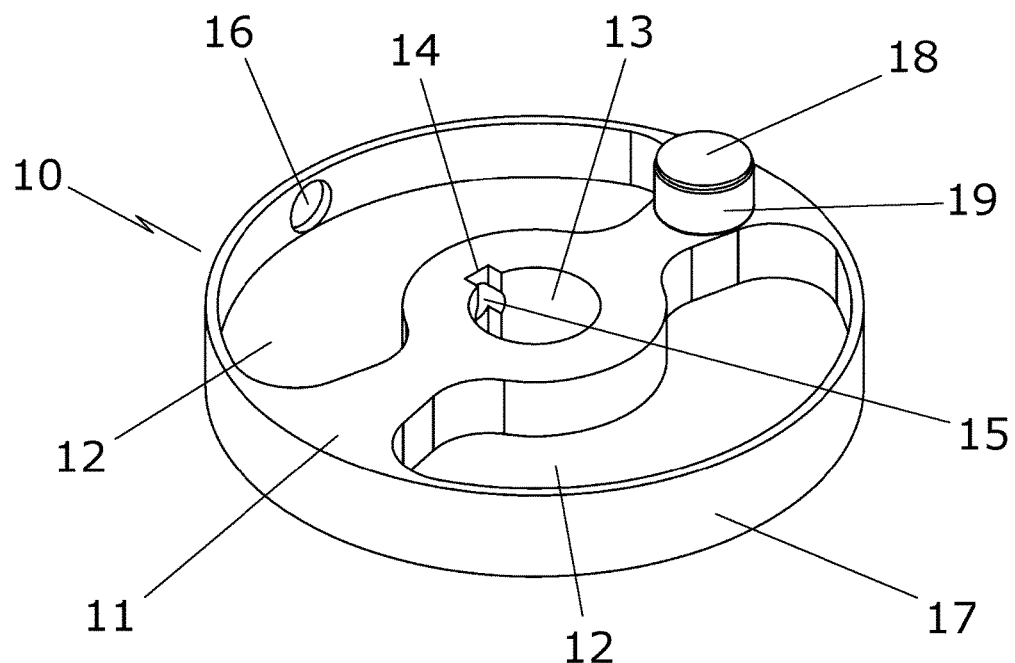
FIG. 1 is a perspective view of the interlocking drive disc, showing the disc body with the modified dowel pin and modified drill bushing in place.
Figure 2:
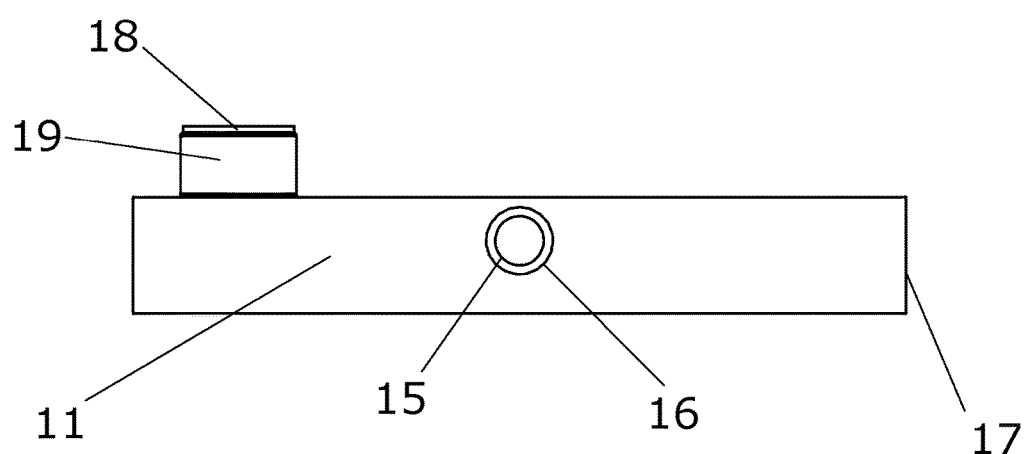
FIG. 2 is a front view of the interlocking drive disc, showing the side aperture and the modified dowel pin and modified drill bushing in place.
Figure 3:
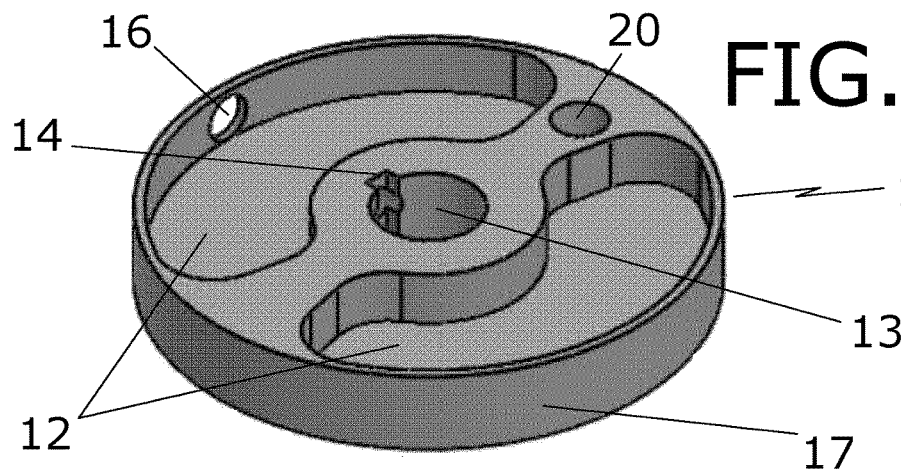
FIG. 3 is a perspective view of the interlocking drive disc, showing the disc body with the modified dowel pin and modified drill bushing removed.
Figure 4:
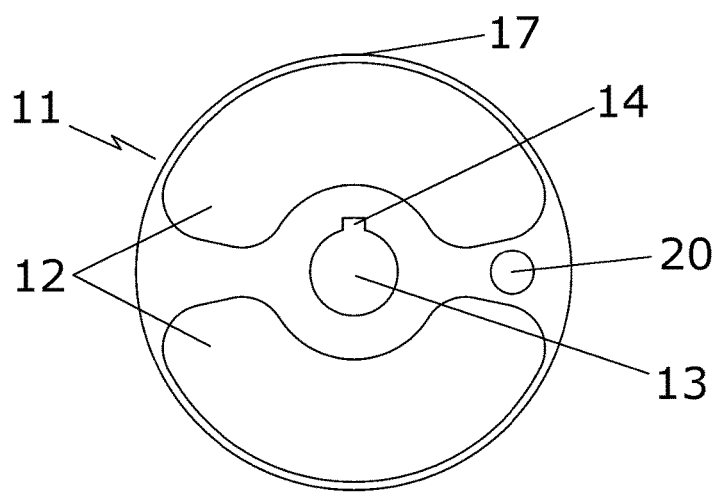
FIG. 4 is a top view of the interlocking drive disc, showing the disc body, the drive aperture, and the dowel pin aperture.
Figure 5:
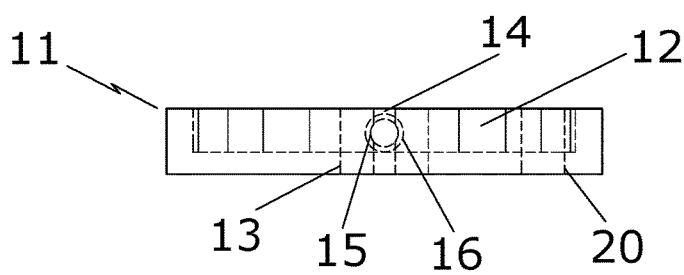
FIG. 5 is a side view of the interlocking drive disc, showing the disc body, the drive aperture, the dowel pin aperture, the side aperture, and the body cavities.
Figure 6:
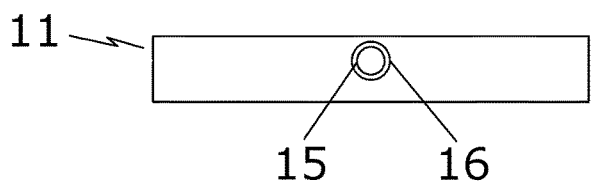
FIG. 6 is a side view of the interlocking drive disc, showing the disc body, and the side aperture.
Figure 10:
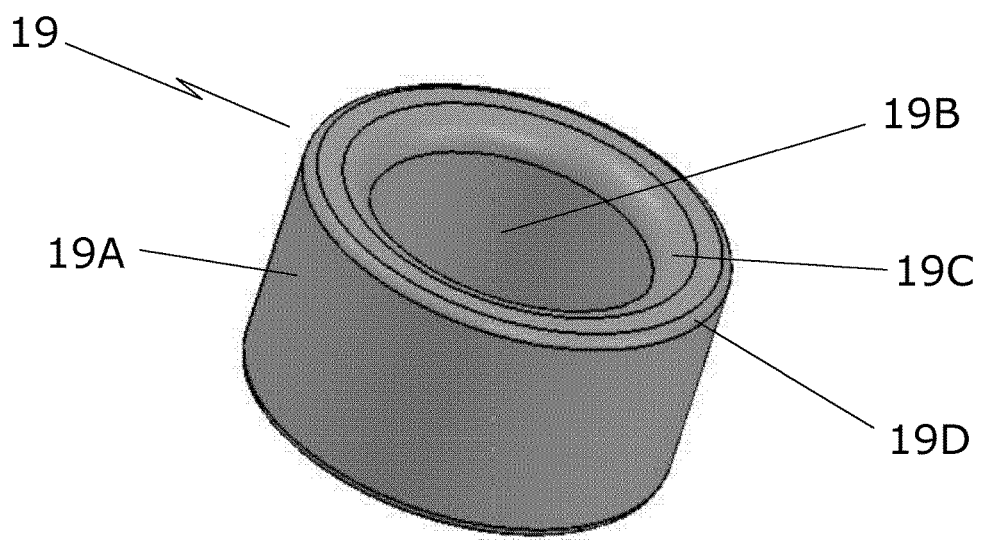
FIG. 10 is a perspective view of the modified drill bushing, showing the drill bushing body and the drill bushing aperture.
Figure 11:
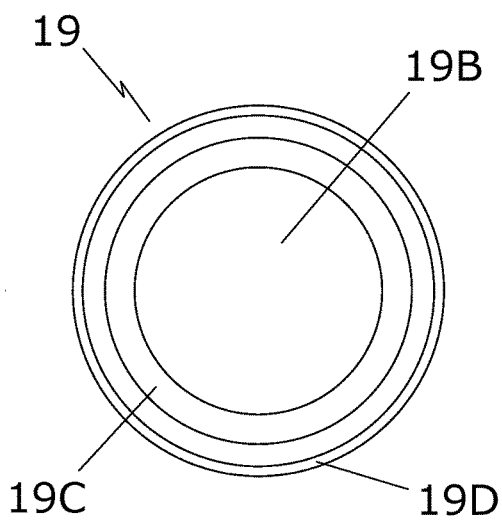
FIG. 11 is a top view of the modified drill bushing, showing the drill bushing body and the drill bushing aperture.
Figure 12:
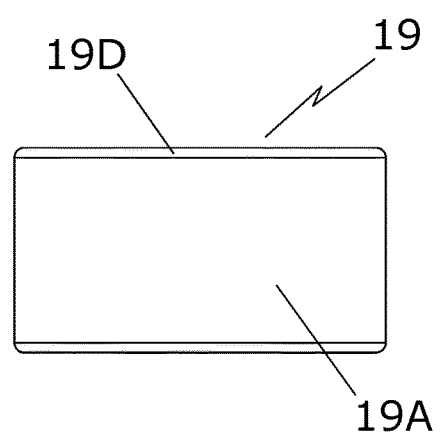
FIG. 12 is a side view of the modified drill bushing, showing the drill bushing body.

Referring now to the invention in more detail, the invention is directed to an interlocking drive disc 10 for an anilox roll.

It is to be understood that while the invention is intended for use with Mark Andy P-Series printing presses, this is not intended as a limitation. With suitable modification or with no modification at all, the invention may be used with any other printing press which uses anilox rolls and dowel pins.

The first exemplary embodiment is comprised of an interlocking drive disc 10. The interlocking drive disc 10 has a disc body 11. The disc body 11 provides body cavities 12 which extend only partially through the disc body. In the center of the drive disc 10 is a drive aperture 13. The drive aperture 13 is mostly circular with a notch 14 on one side. The drive aperture is sized and configured to mount the interlocking drive disc to the anilox roll. Extending from the notch 14 in the drive aperture 13 through to one of the body cavities 12 is a circular inner locking aperture 15. Aligned centrally with the inner locking aperture 15 is an outer locking aperture 16 which extends from the body cavity 12 to the exterior surface 17 of the disc body 11. A modified dowel pin 18 is provided along with a modified bushing 19. The dowel pin 18 extends through the bushing 19 and a dowel pin aperture 20.

The disc body 11 has a preferred diameter of 2.5 inches and a preferred height of 0.375 inches. The body cavities 12 are preferably the same size and shape and should be mirror images across the center of the disc body 11. The mirrored size and shape of the body cavities 12 is to ensure balance while the disc body 11 is rotating. The body cavities 12 have a preferred depth of 0.25 inches from the top surface of the disc body 11. The outer locking aperture 16 should have a slightly larger diameter than the inner locking aperture 15. Both the outer locking aperture 16 and inner locking aperture 15 are preferably centered 0.14 inches from the top surface of the disc body 11. The inner locking aperture 15 has a preferred diameter of 0.19 inches. The outer locking aperture 16 has a preferred diameter of 0.218 inches. The drive aperture 13 has a preferred diameter of 0.501 inches. The notch 14 preferably has a width of 0.125 inches and should extend 0.062 inches out from the outer edge of the drive aperture 13 (0.3125 inches from the center of the drive aperture 13). The dowel pin aperture 20 is preferably 0.25 inches in diameter.

The modified dowel pin 18 includes a dowel pin body 18A and a dowel pin cap 18B. The dowel pin cap is located at one end of the dowel pin body 18A. The dowel pin body 18A preferably has a length of 0.585 inches and a diameter of 0.25 inches. The dowel pin cap 18B preferably has a height of 0.02 inches and a diameter of 0.360 inches.

The modified bushing 19 includes an outer surface 19A and a bushing aperture 19B. The bushing aperture 19B passes through the entire bushing 19. The edge formed between the top/bottom surfaces of the bushing 19 and the bushing aperture 19B is rounded to form an inner fillet 19C. The edge formed between the top/bottom surfaces and the outer surface 19A is also rounded to form an outer fillet 19D. The bushing 19 preferably has a height of 0.208 inches. The bushing 19 preferably has an exterior diameter 0.376 inches. The bushing aperture 19B has a diameter of 0.251 inches such that the dowel pin 18 fits through the bushing aperture 19B. The bushing aperture 19B should be slightly larger than the dowel pin 18 so that the bushing 19 is able to move slightly and rotate around the dowel pin 18.

To use the first exemplary embodiment, the user places the interlocking drive disc 10 over the end of an anilox roll and attaches it through the drive aperture 13. The drive disc 10 is locked onto the anilox role with a locking pin which extends through the inner locking aperture 15 and outer locking aperture 16. The dowel pin 18 and bushing 19 interlock with a hardened drive pin which is attached to a gear on a servo motor. The hardened drive pin engages with the dowel pin 18 and bushing 19. When the servo motor is activated it rotates the gear and attached hardened drive pin. The hardened drive pin then pushes the dowel pin 18 and bushing 19 which causes the disc body 11 to rotate. The disc body 11 in turn rotates the anilox roll with the drive which are engaged through the drive aperture 13. The bushing 19 is able to rotate and move slightly against the hardened drive pin, reducing friction and wear between the dowel pin 18 and the hardened drive pin.

The disc body 11 is preferably made from type 303 stainless steel. This ensures that the disc body 11 does not rust while providing sufficient strength to deal with the forces from the servo motor. The dowel pin 18 and bushing 19 are preferably made from steel with a hardness of 60 on the Rockwell Scale. This hardness provides sufficient resistance to the movement and rotation of the hardened drive pin so that the dowel pin 18 and bushing 19 do not dent or bend from use.

Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. An interlocking drive disc on an anilox roll, comprising: a disc body having at least one body cavity extending partially through the disc body; a drive aperture located at a center of said disc body being configured for attaching the disc body to an anilox roll; a dowel pin aperture; a bushing with a bushing aperture; a dowel pin; said dowel pin extending through said bushing aperture and attaching to said disc body by securing within said dowel pin aperture; said bushing being sized and configured to rotate and move slightly around said dowel pin; wherein said dowel pin is comprised of a dowel pin body and a dowel pin cap; said dowel pin body being cylindrical in shape; said dowel pin cap being circular in shape having a greater diameter than said dowel pin body such that said dowel pin cap secures said bushing on the dowel pin body.

2. The interlocking drive disc of claim 1, wherein said dowel pin body and said dowel pin aperture have about the same diameter and shape such that said dowel pin is securely affixed to said disc body when pressed into said dowel pin aperture.

3. The interlocking drive disc of claim 1, wherein said at least one body cavity is equal to two in number; said two body cavities being the same size and shape such that the cavities are mirrored across a center line of the disc body.

4. The interlocking drive disc of claim 1, further comprising an inner locking aperture; said inner locking aperture extending from said drive aperture through said drive disc body to said body cavity; an outer locking aperture; said outer locking aperture extending from said body cavity through said drive disc body to an exterior surface of said drive disc; and said inner locking aperture and said outer locking aperture being aligned along a central axis.

5. The interlocking drive disc of claim 4, wherein said outer locking aperture has a larger diameter than said inner locking aperture.

6. The interlocking drive disc of claim 4, wherein said drive aperture is circular in shape; and further comprising a notch; said notch being aligned with said inner locking aperture such that said notch is located on the same side of the drive aperture as the inner locking aperture.

7. The interlocking drive disc of claim 1, wherein said bushing has an outer edge, a top surface, and a bottom surface; an edge between the outer edge and top surface being rounded to form a fillet; and an edge between the outer edge and the bottom surface being rounded to forma fillet.

8. The interlocking drive disc of claim 1, wherein said bushing has a top surface and bottom surface; an edge between the top surface and the bushing aperture being rounded to form a fillet; and an edge between the bottom surface and the bushing aperture being rounded to form a fillet.

9. The interlocking drive disc of claim 1, wherein said disc body is manufactured from type 303 stainless steel.

10. The interlocking drive disc of claim 1, wherein said dowel pin is manufactured from steel with a hardness of at least 60 on the Rockwell Scale.

11. The interlocking drive disc of claim 1, wherein said bushing is manufactured from steel with a hardness of at least 60 on the Rockwell Scale.

* * * * *